US010862755B2

(12) United States Patent
Basant et al.

(10) Patent No.: US 10,862,755 B2
(45) Date of Patent: Dec. 8, 2020

(54) HIGH-PERFORMANCE DATA REPARTITIONING FOR CLOUD-SCALE CLUSTERS

(71) Applicant: Oracle International Corporation, Redwood Shores, CA (US)

(72) Inventors: Aarti Basant, Fremont, CA (US); Sam Idicula, Santa Clara, CA (US); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 613 days.

(21) Appl. No.: 15/639,265

(22) Filed: Jun. 30, 2017

(65) Prior Publication Data
US 2019/0007273 A1    Jan. 3, 2019

(51) Int. Cl.
*H04L 12/24* (2006.01)
*G06F 15/173* (2006.01)
(Continued)

(52) U.S. Cl.
CPC ........ *H04L 41/12* (2013.01); *G06F 15/17387* (2013.01); *H04L 45/06* (2013.01);
(Continued)

(58) Field of Classification Search
CPC ......... H04L 41/12; H04L 45/06; H04L 47/12; H04L 49/15; H04L 49/506;
(Continued)

(56) References Cited

U.S. PATENT DOCUMENTS 5,198,979 A * 3/1993 Moorhead ............... G01V 1/362
367/38
6,741,552 B1 * 5/2004 McCrosky .......... H04L 12/5601
370/218
(Continued)

FOREIGN PATENT DOCUMENTS

EP          1 130 872 A1     9/2001

OTHER PUBLICATIONS

Zahavi, Eitan, "Optimized InfiniBand Fat-Tree Routing for Shift All-to-All Communication Patterns", Concurrency and Computation: Practice and Experience, dated 2009, 15 pages. Zahavi, Eitan, "Fat-TreeRouting and Node Ordering Providing Contention Free Traffic for MPI Global Collectives", dated 2012, 10 pages Rodiger et al., "Locality-Sensitive Operators for Parallel Main-Memory Database Clusters", dated 2014, 12 pages.
(Continued)

*Primary Examiner* — James R Sheleheda
(74) *Attorney, Agent, or Firm* — Hickman Palermo Becker Bingham LLP

(57) ABSTRACT

Techniques herein partition data using data repartitioning that is store-and-forward, content-based, and phasic. In embodiments, computer(s) maps network elements (NEs) to grid points (GPs) in a multidimensional hyperrectangle. Each NE contains data items (DIs). For each particular dimension (PD) of the hyperrectangle the computers perform, for each particular NE (PNE), various activities including: determining a linear subset (LS) of NEs that are mapped to GPs in the hyperrectangle at a same position as the GP of the PNE along all dimensions of the hyperrectangle except the PD, and data repartitioning that includes, for each DI of the PNE, the following activities. The PNE determines a bit sequence based on the DI. The PNE selects, based on the PD, a bit subset of the bit sequence. The PNE
(Continued)

selects, based on the bit subset, a receiving NE of the LS. The PNE sends the DI to the receiving NE.

45 Claims, 10 Drawing Sheets

(51) Int. Cl.
*H04L 12/721* (2013.01)
*H04L 12/933* (2013.01)
*H04L 12/931* (2013.01)
*H04L 12/801* (2013.01)
*H04L 29/08* (2006.01)

(52) U.S. Cl.
CPC .............. *H04L 47/12* (2013.01); *H04L 49/15* (2013.01); *H04L 49/506* (2013.01); *H04L 49/1546* (2013.01); *H04L 49/354* (2013.01); *H04L 67/1097* (2013.01)

(58) Field of Classification Search
CPC ............... H04L 49/1546; H04L 49/354; H04L 67/1097; G06F 15/17387
See application file for complete search history.

(56) References Cited

U.S. PATENT DOCUMENTS

| | | | |
|---|---|---|---|
| 9,626,329 B2* | 4/2017 | Howard | G06F 9/5066 |
| 2003/0126122 A1* | 7/2003 | Bosley | G06F 16/1834 |
| 2003/0131041 A1* | 7/2003 | Dinker | G06F 9/52 |
| | | | 718/104 |
| 2004/0215805 A1* | 10/2004 | Tan | H04L 65/608 |
| | | | 709/231 |
| 2005/0187643 A1* | 8/2005 | Sayyar-Rodsari | G05B 13/048 |
| | | | 700/29 |
| 2008/0285562 A1* | 11/2008 | Scott | H04L 45/745 |
| | | | 370/392 |
| 2009/0052462 A1* | 2/2009 | Archer | H04L 45/32 |
| | | | 370/406 |
| 2009/0055474 A1* | 2/2009 | Archer | G06F 15/173 |
| | | | 709/204 |
| 2009/0097418 A1* | 4/2009 | Castillo | H04L 41/5035 |
| | | | 370/255 |
| 2009/0154481 A1* | 6/2009 | Han | H04L 12/66 |
| | | | 370/406 |
| 2009/0240838 A1* | 9/2009 | Berg | G06F 15/17337 |
| | | | 709/252 |
| 2010/0205588 A1* | 8/2010 | Yu | G06F 8/4441 |
| | | | 717/149 |
| 2010/0241828 A1* | 9/2010 | Yu | G06F 8/456 |
| | | | 712/30 |
| 2012/0023260 A1* | 1/2012 | Minkenberg | G06F 15/17387 |
| | | | 709/238 |
| 2013/0018901 A1* | 1/2013 | Bnayahu | G06F 16/258 |
| | | | 707/756 |
| 2013/0083701 A1* | 4/2013 | Tomic | H04L 45/06 |
| | | | 370/255 |
| 2014/0314099 A1* | 10/2014 | Dress | H04L 49/15 |
| | | | 370/422 |
| 2015/0149509 A1* | 5/2015 | Leu | G06F 16/24554 |
| | | | 707/803 |
| 2016/0337442 A1 | 11/2016 | Idicula et al. | |
| 2017/0046371 A1* | 2/2017 | Bensberg | G06F 16/2456 |
| 2017/0093517 A1* | 3/2017 | Liu | H04L 12/6418 |
| 2017/0099231 A1* | 4/2017 | Li | H04L 43/0817 |
| 2017/0172008 A1* | 6/2017 | Narayanan | G06F 15/17387 |
| 2017/0187616 A1* | 6/2017 | Chen | H04L 12/46 |
| 2017/0195212 A1* | 7/2017 | Chen | G06F 3/067 |
| 2017/0337241 A1* | 11/2017 | Newbern | G06F 16/24568 |
| 2018/0159774 A1 | 6/2018 | Aggarwal | |
| 2019/0007273 A1* | 1/2019 | Basant | H04L 45/06 |
| 2020/0133741 A1* | 4/2020 | Lie | G06F 9/30036 |

OTHER PUBLICATIONS

Perry et al., "Fastpass: A Centralized Zero-Queue", Datacenter Network, SIGCOMM, dated Aug. 2014, 12 pages.

Palur et al., "Understanding Torus Network Performance through Simulations", dated 2014, 2 pages.

Novakovic et al., "Scale-Out NUMA" In Proceedings of ASPLOS-XIX, Mar. 2014, 15 pages.

Mohammad Al-Fares et al., "Hedera: Dynamic Flow Scheduling for Data Center Networks", dated Apr. 2010, 15 pages.

Long et al., "Longest-queue-first scheduling under SINR interference model", ACM, dated Sep. 20, 2010, 10 pages.

EG Gran, SA Reinemo. "InfinBand congestion control: modelling and validation", In Proceedings of the 4th International ICST Conference on Simulation Tools and Techniques(ICST), 2011, 8 pages.

Anonymous:, "Time Division Multiple Access Wikipedia, the free encyclopedia", from the internet https://web.archive.org/web/20150509120053, dated Sep. 7, 2016, 4 pages.

Alan R Hevner et al., "Query Processing in Distributed Database System", dated May 1, 1979, from the Internet, http://ieexplore,ieee.org.ielx5/32/35910/01702617, 12 pages.

Aggarwal, U.S. Appl. No. 15/372,224, filed Dec. 7, 2016, Notice of Allowance, dated Jan. 17, 2019.

Idicula, U.S. Appl. No. 14/711,617, filed May 13, 2015, Notice of Allowance, dated Jun. 8, 2017.

Idicula, U.S. Appl. No. 14/711,617, filed May 13, 2015, Notice of Allowance, dated Feb. 15, 2017.

Aggarwal, U.S. Appl. No. 15/372,224, filed Dec. 7, 2016, Office Action, dated Jul. 27, 2018.

Aggarwal, U.S. Appl. No. 15/372,224, filed Dec. 7, 2016, Interview Summary, dated Nov. 23, 2018.

\* cited by examiner

HIGH-PERFORMANCE DATA REPARTITIONING FOR CLOUD-SCALE CLUSTERS

FIELD OF THE DISCLOSURE

This disclosure relates to data partitioning for a distributed system. Presented herein are techniques that achieve high-performance data partitioning by dividing the partitioning into phases.

BACKGROUND

Analytic applications such as graph analysis, online analytic processing (OLAP), or bulk synchronous parallelism (BSP) may process immense datasets that are typical of data warehousing and Big Data. For example, a dataset may be too big to store or load at a single computer. Thus, horizontal scaling may be needed and achieved by partitioning a dataset amongst computers of a cluster, a data center, or other distributed topology. Periodic or circumstantial repartitioning of the dataset may occasionally be needed, such as for load rebalancing.

In recent years, much research has been done in the area of data processing for analytic workloads in distributed systems. As data volumes grow and very large clusters of processing nodes become available on computational clouds, distributed systems may need much horizontal scaling (e.g. thousands of nodes) while still maintaining high performance per node. For cloud-scale clusters, the ability to efficiently partition data between the participating nodes can be a challenging phase of execution from a scalability or performance standpoint. Analyzing the performance of distributed query processing in large scale systems has revealed that a phase of data exchange (also known as data repartitioning or data re-shuffle), which involves a potentially all-to-all communication pattern, often consumes a significant percentage of total query time. As a cluster grows (i.e. horizontal scaling), the performance of all-to-all communication deteriorates significantly. As the number of nodes in a cluster increases, throughput per node in an all-to-all communication phase incurred by a cluster-wide data shuffle tends to diminish. That barrier to horizontal scalability may occur even with high-performance switching fabric such as InfiniBand. For example, diminishing returns for cluster growth may occur even though nodes are connected using a 4× InfiniBand FDR network with single port bandwidth of 7 GBps. This has been experimentally confirmed even in a tiered switch hierarchy using commercially available Infiniband switches. Maximum achievable throughput in a 64 node cluster is ~32% less than maximum achievable throughput in a two node cluster.

The reduced network bandwidth becomes a more prominent bottleneck as the size of the cluster increases. This bottleneck limits the scalability achievable in large distributed systems, especially as they approach cloud-scale (thousands of nodes). Hence, techniques are needed to overcome this lower network bandwidth for larger clusters to achieve better scalability and performance.

There are at least two primary reasons why network throughput for a large scale distributed system connected using high speed interconnect such as InfiniBand decreases as the cluster grows.

A first reason is network backpressure and endpoint congestion. If multiple sender nodes send data to a same receiver node in a cluster, then each sender is effectively sharing the receiver endpoint's bandwidth. Hence even if the receiver maintains full bandwidth, the sender sees a divided bandwidth.

A second reason is that too many active communicating pairs of nodes lead to reduced performance at a switch. Even high-performance networks like InfiniBand are subject to that degradation. To avoid head-of-line (HOL) blocking, the InfiniBand flow control mechanism has a native concept of queue pairs to identify a flow between any two communicating nodes. Other network technologies may use other flow control mechanisms but the following explanation uses Infiniband terminology as a representative example. For a system with N nodes, the network switch may have to handle $N^2$ queue pair connections for all possible flows in the cluster. Each node's network adapter must handle N queue pairs. Due to hardware limitations such as a) cache sizes, b) number of buffers, and c) flow scheduling tradeoffs, even the best network switches and adapters that internally use multistage circuit switching, such as with a Clos network, that theoretically allow for full bandwidth between all pairs of endpoints, experience significant degradation in performance as the number of communicating pairs of nodes becomes high. For example, state-of-the-art InfiniBand adapters can efficiently hold only a limited number of queue pairs in its cache. That may be aggravated if each pair of communicating nodes may need to have multiple queue pairs for different types of messages. Once the number of active queue pairs in the system exceeds a certain size, then packet transfer on a queue pair may incur very high latency within the InfiniBand hardware due to the impacts such as cache misses. That reduces data transfer throughput. This problem certainly manifests at larger scales, typically starting at around 128 nodes.

Current solutions try to solve the problem of bandwidth degradation using some form of scheduling. While these solutions address the problem of congestion at endpoints and internal switch links (and hence scale well to around 64-to-128 nodes), they do not handle the problem of a larger number of active communicating pairs and the related loss of performance.

DETAILED DESCRIPTION

Figure 1:
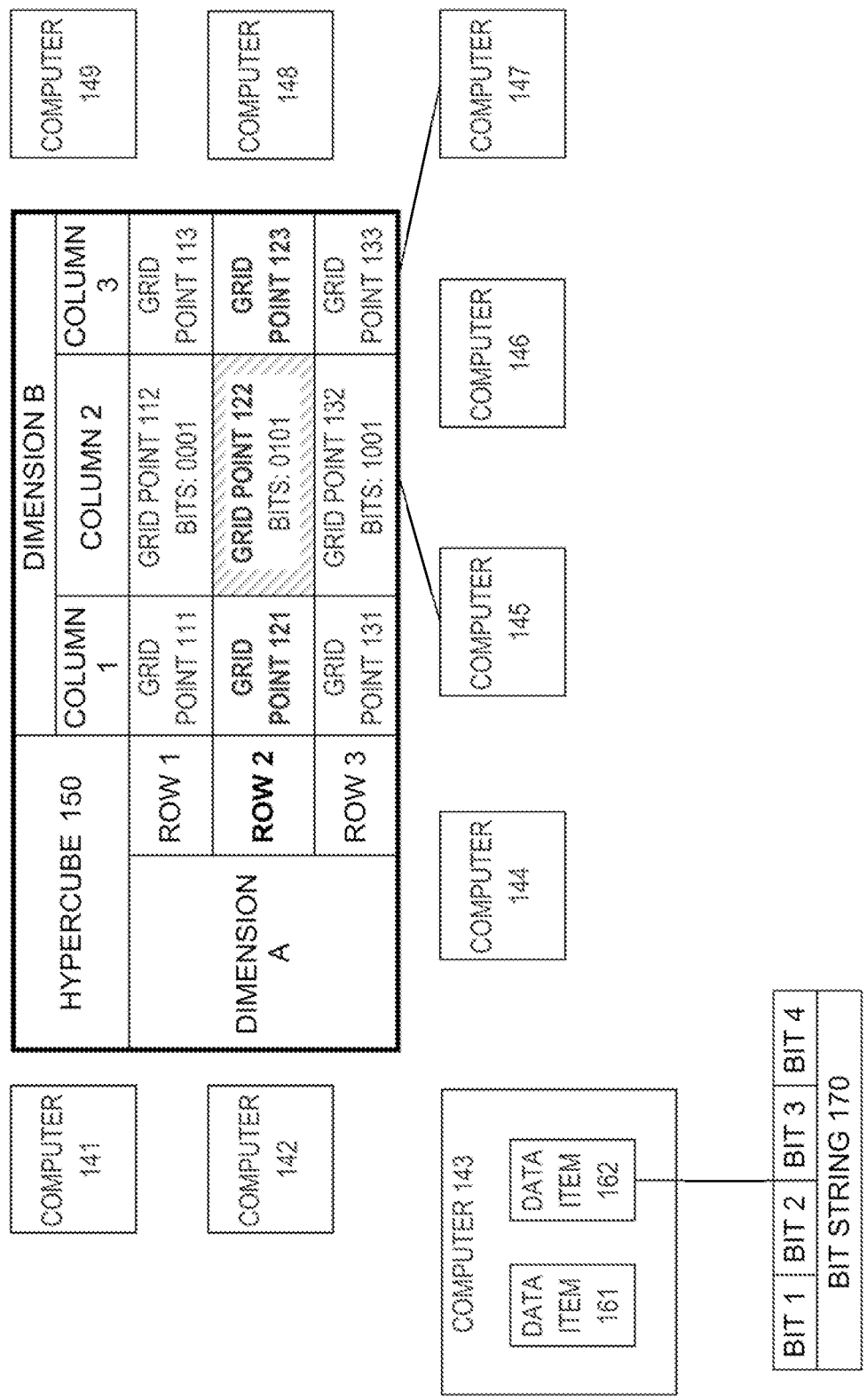
FIG. 1 is a block diagram that depicts an example distributed system that performs data repartitioning that is store and forward, content based, and phasic, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Example Distributed System
   2.1 Physical Topology
   2.2 Logical Topology
   2.3 Data Repartitioning Phase
   2.4 Geometry
   2.5 Grid Point
   2.6 Dimension
   2.7 Realignment
   2.8 Communication
   2.9 Hop
   2.10 Shuffle
   2.11 Bit
   2.12 Data Item
   2.13 Route
3.0 Network
   3.1 Congestion
   3.2 Backpressure
   3.3 Protocol
4.0 Switching
   4.1 Payload
   4.2 Packet
5.0 Prism
6.0 Content Based Route
   6.1 Extent
   6.2 Content Address
   6.3 Hash
   6.4 Database Table
   6.5 Join
   6.6 Key
   6.7 Substring
   6.8 Equilateral Ideal
   6.9 Logical
   6.10 Physical
   6.11 Dynamism
7.0 Example Data Repartitioning Process
   7.1 Configuration
   7.2 Multitenancy
   7.3 Example Algorithm
8.0 Physical Tiers
   8.1 Heterogeneity
   8.2 Network Card
   8.3 Domain
   8.4 Spine
   8.5 Leaf
   8.6 Rectangle
   8.7 Tesseract
   8.8 Non-uniformity
9.0 Pipeline
   9.1 Timeline
   9.2 Batch
   9.3 Computation
   9.4 Communication
   9.5 Overlap
10.0 Hardware Overview
11.0 Software Overview
12.0 Cloud Computing 1.0 General Overview Techniques are provided for high-performance data partitioning by dividing the partitioning into phases. In an embodiment, a system of computers maps compute nodes to grid points in a hyperrectangle. The mapping may be independent of the underlying network topology and routing. A hyperrectangle is a multidimensional geometric shape such as a rectangle, a cube or other right rectangular prism, or a hypercube. Each of the mapped computers contains data items. For each particular dimension of the hyperrectangle the computer performs processing. The processing includes, for each particular computer, various activities. These activities include: a) determining a linear subset of computers that are mapped to grid points in the hyperrectangle at a same position as the grid point of the particular computer along all dimensions of the hyperrectangle except the particular dimension, and b) data repartitioning. The data repartitioning includes, for each data item of the particular computer, the following activities. The particular computer determines a sequence of bits that is based on the data item. The particular computer selects, based on the particular dimension, a subset of bits of the sequence of bits. The particular computer selects, based on the subset of bits, a receiving computer of the linear subset of computers. The particular computer sends the data item to the receiving computer. Thus, the system of computers achieves shuffling of data from all computers to all computers.

In embodiments, a data item may traverse intermediate computers in multiple hops to reach an intended destination computer according to Manhattan (orthogonal) style delivery. With each hop, data within received messages is repartitioned/rearranged to emit different messages. Navigation during the traverse may involve portions of a bit string that identifies/addresses a receiving computer. The bit string is derived from (or otherwise associated with) the content of a data item. Thus, the data repartitioning is content based.

An intermediate computer may receive many data items from a same source computer and from other computers. The intermediate computer may disassemble a received message to extract many data items and reassemble them into multiple new messages to be sent to different destination computers. Unlike network routing, payloads are repartitioned and rearranged based on content. Also unlike network routing, repartitioning is orchestrated by data-oriented application logic instead of data-agnostic transport firmware. Thus, repartitioning may achieve an overlay network that can work with ordinary packet switching infrastructure but is not an aspect of such switching infrastructure.

The logical topology of the hyperrectangle need not reflect the underlying physical network topology. As explained herein, a logical topology may be optimized for a special physical network topology, such as a hierarchy of switching tiers.

2.0 Example Distributed System

FIG. 1 is a block diagram that depicts an example distributed system 100, in an embodiment. Distributed system 100 performs data repartitioning that is store and forward, content based, and phasic.

2.1 Physical Topology

Distributed system 100 contains computers 141-149. Computers 141-149 may each be a computer such as a blade or other network element such as a network switch, or other processing component having its own network interface.

Distributed system 100 may be designed for horizontal scalability and may contain thousands of computers interconnected by dozens of network switches. In embodiments, switches and computers are generalized as network elements that are treated more or less similarly as being nodes that contribute repartitioning behavior. In other embodiments, switches are more or less ignored other than for transmission, and only endpoints (computers) participate as nodes that contribute repartitioning behavior.

Although not shown, computers 141-149 are interconnected by one or more computer networks, such as a local area network (LAN) or a backplane. Computers 141-149 are logically fully connected.

Thus, a computer such as 141 may communicate with the rest of computers 142-149. However, computer 141 need not be directly connected to the rest of computers 142-149.

For example, computer 142 may be needed to relay a data item (e.g. 161-162) from computer 141 to computer 143. The physical topology (physical connectivity amongst computers 141-149) of distributed system 100 may be arbitrary. However, some physical topologies may be more efficient (have less contention and higher system throughput) than others.

2.2 Logical Topology

Distributed system 100 superimposes an overlay network (logical topology) upon its physical topology. However, distributed system 100 adjusts its logical topology in phases.

Thus, each phase has a different logical topology. During each phase, a data item may traverse (be sent) from one computer to another.

2.3 Data Repartitioning Phase

Due to limitations of the logical topology, a data item may be unable to directly reach whichever computer is its intended destination. For example data item 161 may traverse from computer 141 to computer 142 in a first phase, and then reach computer 143 (the intended destination) in a second phase.

Thus, a data item may need multiple hops (traversals) to reach its intended destination. Thus, each phase allows one hop for each data item in transit.

2.4 Geometry

The logical topology is a hyperrectangle, which is a multi-dimensional geometric shape such as a rectangle, a cube or other right rectangular prism, or a hypercube. The logical topology may have arbitrarily many dimensions.

An optimal amount of dimensions depends on how many computers are available, their communication capacities, and their arrangement within a physical network topology.

No matter how many dimensions, a hypercube (e.g. a square, such as hypercube 150) is ideal, and a closest approximation of a hypercube for an amount of computers is optimal.

2.5 Grid Point

Hypercube 150 is a square that is dissected into a 3×3 logical grid of smaller squares, which are grid points 111-113, 121-123, and 131-133. Each of computers 141-149 is associated with a respective grid point of 111-113, 121-123, and 131-133.

Thus there is a one-to-one bidirectional (bijective) mapping between a grid point and a computer. For example, grid points 132-133 are respectively associated with computers 145 and 147 as shown.

2.6 Dimension

As introduced above, communication amongst computers 141-149 occurs in phases. There is one phase for each dimension of hypercube 150.

Because hypercube 150 has two dimensions, there a two communication phases. There is a respective dimension for each phase.

The first phase respects dimension A (shown). The second phase respects dimension B.

2.7 Realignment

Each phase superimposes a different linear alignment onto grid points 111-113, 121-123, and 131-133 (and thus onto computers 141-149). The alignment is linear because it arranges subsets of the grid points into lines (e.g. rows or columns).

Thus, each phase logically rearranges the grid points (and computers) into parallel lines. Even if hypercube 150 were a cube with three dimensions or more, the alignment for each phase still entails parallel lines.

In the first phase, the grid points are arranged into rows 1-3 as shown. In the second phase, the grid points are arranged into columns 1-3.

2.8 Communication

In each phase, the computers only communicate with other computers that are in the same line (row or column). Thus in the first phase, a computer that is assigned to grid point 122 communicates only with other computers in row 2, which are those assigned to grid points 121 and 123 (drawn bold).

Likewise during the second phase, the computer that is assigned to grid point 122 communicates only with other computers in column 2, which are those assigned to grid points 112 and 132. Thus, the communication (logical) topology of the grid points changes at each phase, while the physical topology of the computers remains unchanged.

At first glance it may seem that all-to-all communication is impossible because the logical topology is restrictive. For example, the computers assigned to grid points 111 and 123 never directly communicate with each other because grid points 111 and 123 share neither a row nor a column.

Likewise first glance it may seem that all-to-all communication is impossible because each computer directly communicates only with a minority of computers 141-149 during each phase. In this example, each computer directly communicates with two other computers for each of two phases. Thus in this example, each computer directly communicates with only four other computers in total, even though there are nine computers in distributed system 100.

2.9 Hop

Message transport is based on store and forward routing, with one communication hop being made for each communication phase to achieve multi-hop delivery. Thus, a message may be sent from grid point 123 to grid point 121 during the first phase, and then sent from grid point 121 to grid point 111 in the second phase. Thus based on Manhattan style (orthogonal) routing, all-to-all communication is achieved in as few phases as hypercube 150 has dimensions (two).

2.10 Shuffle

Distributed system 100 may use that all-to-all communication to shuffle (repartition) data for a bulk synchronous parallel (BSP) computation. For example, that may accomplish the data shuffle phase of the MapReduce algorithm.

2.11 Bit

For data repartitioning purposes, each grid point is assigned a unique bit string that has enough bits to encode the sum of all dimension sizes of hypercube 150. Thus because hypercube 150 is 3×3, a bit string should have $\log_2(3+3)$=four bits.

For example, grid point 122 is assigned unique bit string '0101'. Which grid point is assigned which bit string is important for phased data repartitioning, but is not described until later herein.

The bit string assignments may be used as a logical identifier or address of a computer. The bit string assignments may also be used as a key for partitioning data. Thus, a bit string may be used for content-based addressing as follows.

2.12 Data Item

During operation, distributed system 100 hosts a distributed application (not shown) that entails communication of data items between the computers. For example, computer 143 may cache data items 161-162: a) that were originally loaded by computer 143 but is actually needed at other computer(s), b) that were delivered from other computer(s) to computer 143 as a final destination, or c) that temporarily reside at computer 143 between hops of a delivery between other computers.

Thus in some scenarios, computer 143 should communicate data item 161 to another computer. For example, computer 149 may route data item 161 to computer 142 through computer 143.

2.13 Route

Thus, computer 143 should examine the content of data item 161 to decide where to route data item 161. In embodiments, computers 141-149 each has a copy of a lookup table that assigns content to bit strings, such as 170.

For example, data item 162 may be an overdue purchase order, and overdue purchase orders may be assigned bit string '1001' that is assigned to grid point 132 that is associated with computer 145. Thus, content-based addressing sends overdue purchase orders to computer 145.

Bit string 170 may further be used to precisely route data item 162 through multiple hops that traverse multiple grid points (and computers). The mechanics and semantics of bit strings for data repartitioning are discussed later herein.

3.0 Network

Figure 2:
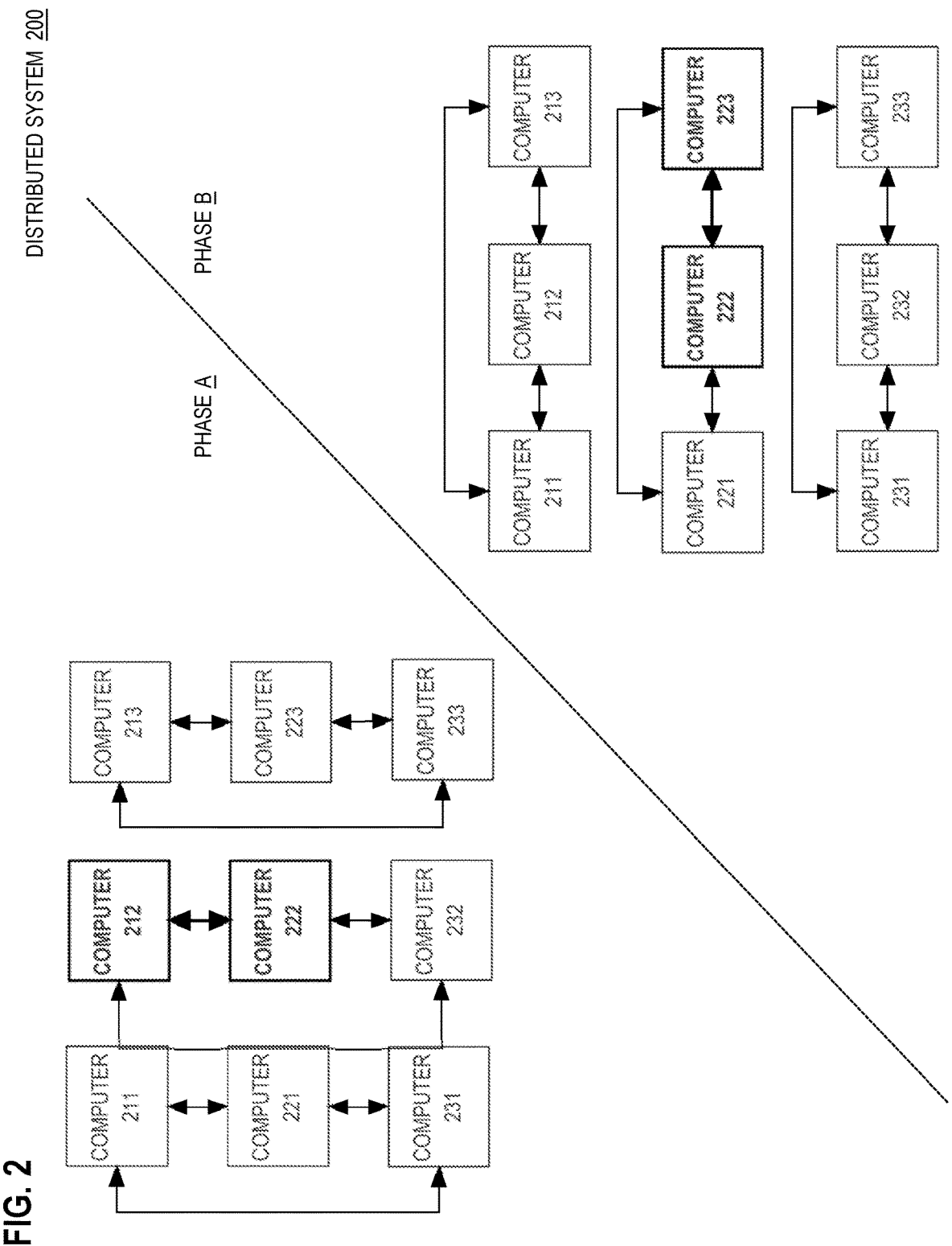
FIG. 2 is a block diagram that depicts an example distributed system that performs grid based data repartitioning in two phases, in an embodiment.

FIG. 2 is a block diagram that depicts an example distributed system 200, in an embodiment. Distributed system 200 performs Manhattan style routing in two phases. Distributed system 200 may be an implementation of distributed system 100.

Distributed system 200 contains computers 211-213, 221-223, and 231-233 that are logically arranged as a 3×3 square. During communication phase A, each computer communicates only with other computers in a same column.

During communication phase B, each computer communicates only with other computers in a same row. Data from computer 212 may flow to computer 222 during phase A (drawn bold) and then on to computer 223 in phase B (bold).

3.1 Congestion

By restricting communication according to a phasic logical topology, distributed system 200 achieves two opposing goals: 1) all-to-all communication, and 2) reduced network congestion/contention.

Congestion may occur in different ways. Excessive fan-in and fan-out at a network element may cause physical congestion, such as endpoint saturation or connectivity contention at an Ethernet or other crossbar switch. For example, a physical link between two switches may saturate.

Congestion may instead entail saturation of a hardware bottleneck other than transmission fabric. For example, a switch or a network interface card may have internal (e.g. connection-oriented) state that is cached and prone to thrashing. Refreshing of evicted internal state may entail latency at a memory bus or I/O waiting (e.g. disk) for swapping of virtual memory.

3.2 Backpressure

No matter the cause of congestion, the effect (especially for switch saturation) may be network backpressure (infectious congestion that spreads). Backpressure may be especially problematic at a switch that succumbs to head-of-line blocking.

The problem may be severe when occurring at a link between two switches because backpressure may occur in both directions (upstream and downstream, radiating out from both switches to other network elements). Some aspects of network congestion may arise regardless of whether network transmissions are connection-oriented or connectionless.

3.3 Protocol

The techniques herein may reduce contention in the network. For example in either case, the techniques reduce network contention by reducing the number of communicating pairs of computers, such that all-to-all communication does not occur during any particular multidimensional communication phase. For example instead of a rectangle having rows*columns active connections per computer as is typical of all-to-all repartitioning in a single phase, only rows+columns active connections (i.e. communicating pairs) are needed per computer with phased data repartitioning.

4.0 Switching

Figure 3:
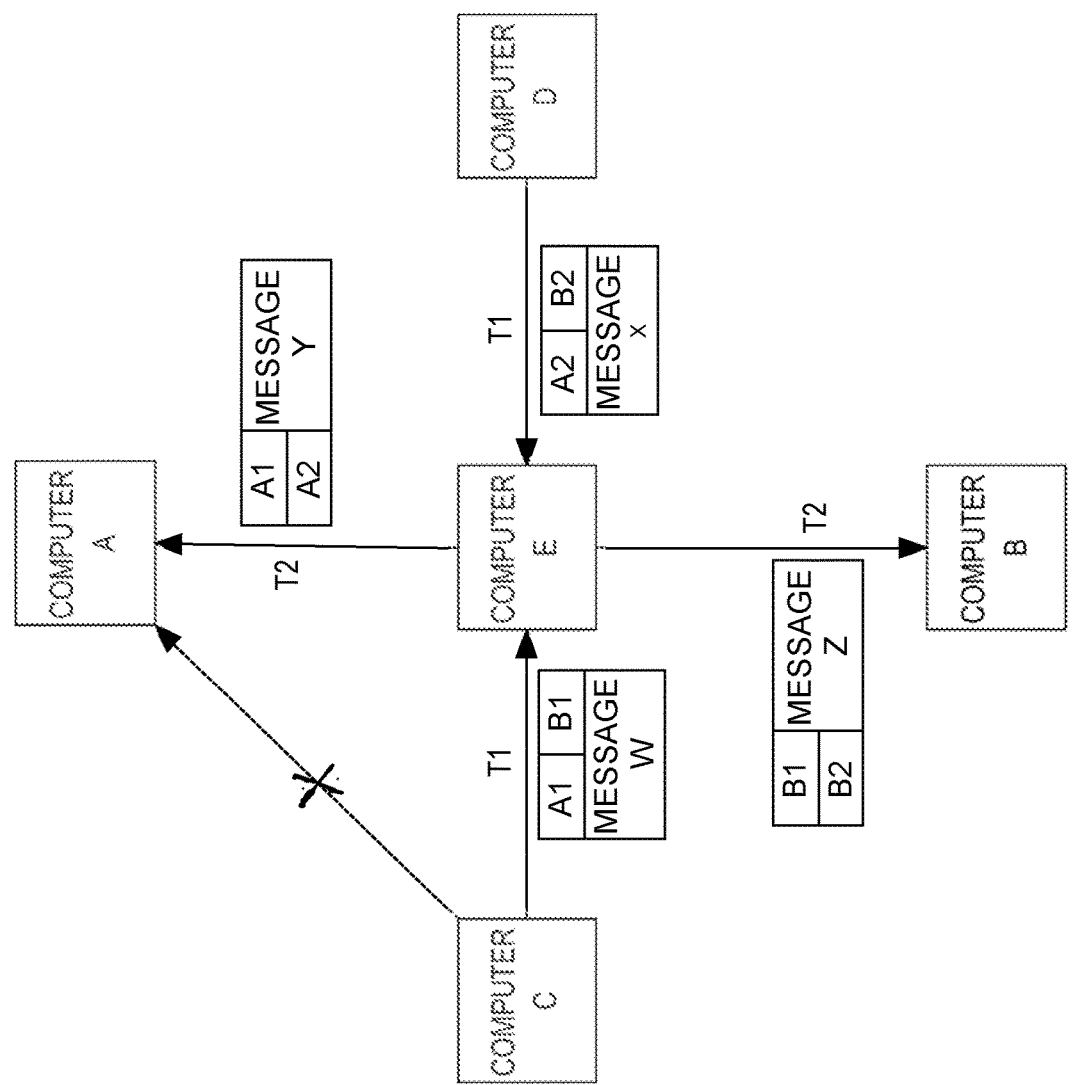
FIG. 3 is a block diagram that depicts an example distributed system that disassembles received messages into fragments for reassembly into different messages for sending, in an embodiment.

FIG. 3 is a block diagram that depicts an example distributed system 300, in an embodiment. Distributed system 300 disassembles received messages into fragments for reassembly into different messages for sending.

Distributed system 300 may be an implementation of distributed system 100. Distributed system 300 contains computers A-D.

In operation, computer C may need to send data item A1 to computer A. Naively, computer C could send data item A1 directly (shown as dashed line) to computer A.

However, techniques herein restrict communication to a phasic logical topology. Thus, computer C should not (shown as X) communicate directly with computer A.

Instead, computer C indirectly sends data item A1 to computer A through computer E. Computer C may also more or less simultaneously indirectly send other data items through computer E.

4.1 Payload

For example, computer C may during phase T1 also indirectly send data item B1 to computer B through computer E. Thus, computer C may send data items A1 and B1 to computer E in a same compound (multi-item) message.

For example, computer C may send data items A1 and B1 in a same message, such as W, or even in a same network packet. Thus during phase T1, computers C-D respectively send messages W-X to computer E. Thus temporarily between phases T1 and T2, computer E has data items A1-A2 and B1-B2.

Although computer E may receive data items A1 and B1 together in message W, data items A1 and B1 have different final destinations. For example, data item A1 is destined for computer A.

Whereas, data item B1 is destined for computer B. Thus, intermediate computer E should relay data items A1 and B1 to respective computers A-B during phase T2.

Thus, computer E should more or less simultaneously extract data items A1 and B1 from message W and data items A2 and B2 from message X, because computer E should not relay those data items in the same combinations as received. For example during phase T2, data items A1-A2 may be sent together to computer A, even though data items A1-A2 arrived at computer E in different messages W-X from different computers C-D.

Between phases T1-T2, computer E may perform content-based data repartitioning to decide which of data items A1-A2 and B1-B2 should be relayed together to computer A. For example, a lookup table or hash function may reveal that data items A1-A2 map to a same bit string that is assigned to computer A.

Based on that bit string, computer E may insert data items A1-A2 into a same message Y. Likewise if data items B1-B2 both hash to another same bit string, computer E may insert data items B1-B2 into a same message Z.

During phase T2 computer E may send messages Y-Z respectively to computers A-B. The mechanics and semantics of bit strings produced by hashing and consumed during multidimensional data repartitioning are discussed later herein.

4.2 Packet

Because a data exchange between large numbers of computational nodes is broken into multiple phases with fewer communicating pairs of computers, the data packet sizes involved during network transfer increases. Thus, an intermediate computer that relays data for many other computers may receive data that is intended for multiple destinations aggregated into, for example, a single packet. That results in larger network packet sizes. Larger network packet sizes yield better data transfer throughput (at least until a network link becomes saturated). The transfer mechanism described above yields larger network packets. Hence, distributed system 300 is likely to achieve higher throughput than a simple single phase data transfer.

5.0 Prism

Figure 4:
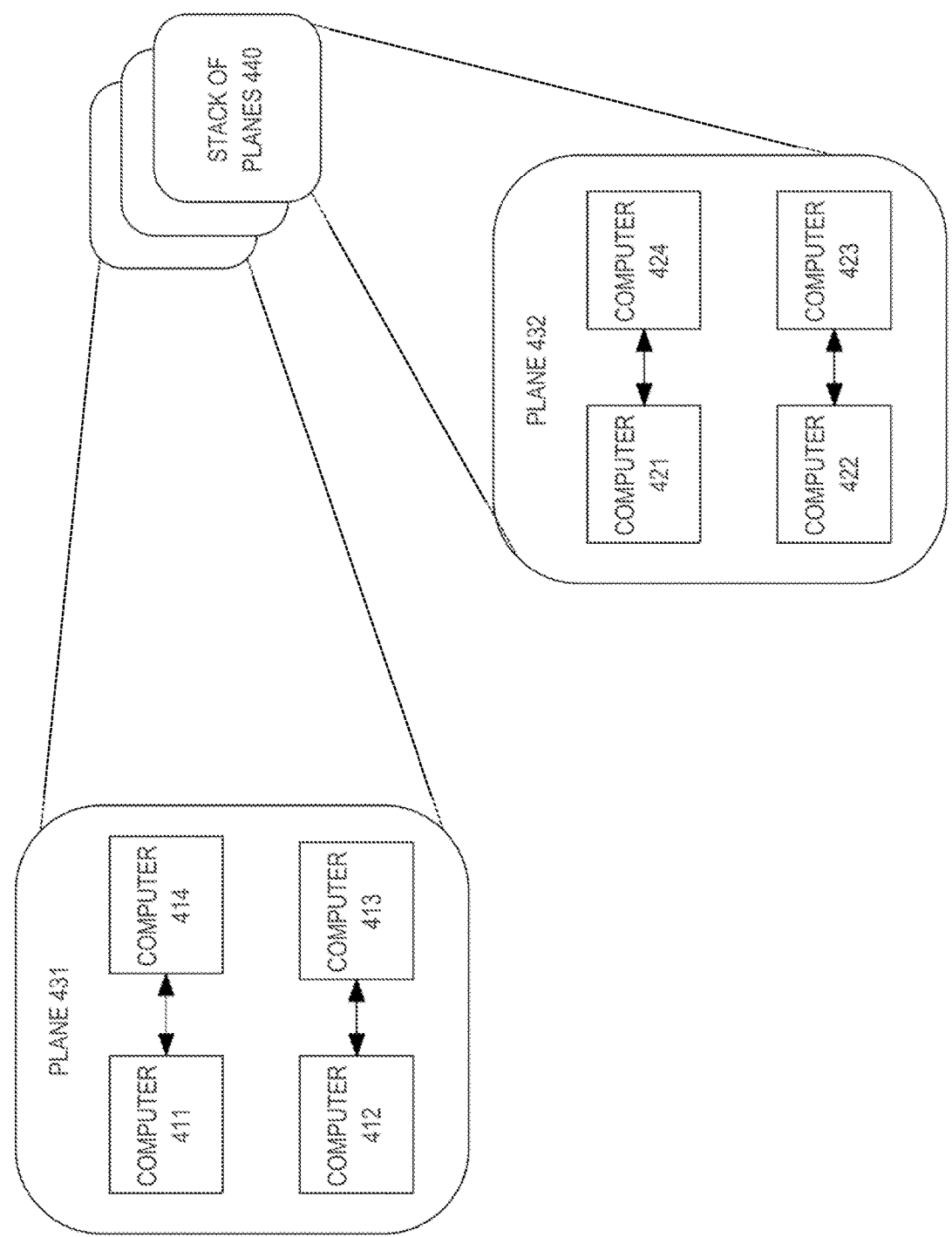
FIG. 4 is a block diagram that depicts an example cube as a logical topology that is configured as a right rectangular prism that has three dimensions, in an embodiment.

FIG. 4 is a block diagram that depicts an example cube 400, in an embodiment. Cube 400 is a logical topology that is configured as a right rectangular prism (e.g. a cube) that has three dimensions.

Cube 400 may be an implementation of distributed system 100. Cube 400 contains computers 411-414 and 421-424.

Because cube 400 has three dimensions, three data repartitioning phases are superimposed on communications within cube 400. Each phase uses a different axis (dimension) of cube 400 to dissect cube 400 into rectangles (2×2 squares such as planes 431-432).

Thus during a first phase, cube 400 may be divided into planes that are layered along a y-axis for vertical stacking, shown as stack of planes 440. Whereas, in a second phase, cube 400 may be divided into planes that are layered along a x-axis for horizontal stacking (not shown).

In a third phase, cube 400 may be divided into planes that are layered along a z-axis for depth stacking (not shown). Thus, cube 400 is dissected into a different layering of planes of computers during each phase.

During a particular phase, computers are logically arranged into parallel lines within each plane. A computer may communicate with all of the other computers that occupy the same line (of the same plane).

For example, computers 411 and 414 may communicate with each other (as shown) during a particular phase because they occupy a same line (of same plane 431). During the same phase (e.g. concurrently), computers 421 and 424 may communicate with each other as shown.

With each phase, the computers are reassigned to new planes along a new axis. Thus after three phases, all-to-all communication is achieved throughout all three dimensions of cube 400.

Although not shown, hyperrectangular logical topologies that have more than three dimensions may also be divided within each of more than three phases into parallel lines within parallel planes. Thus, the techniques herein scale to arbitrarily many dimensions.

6.0 Content Based Route

Figure 5:
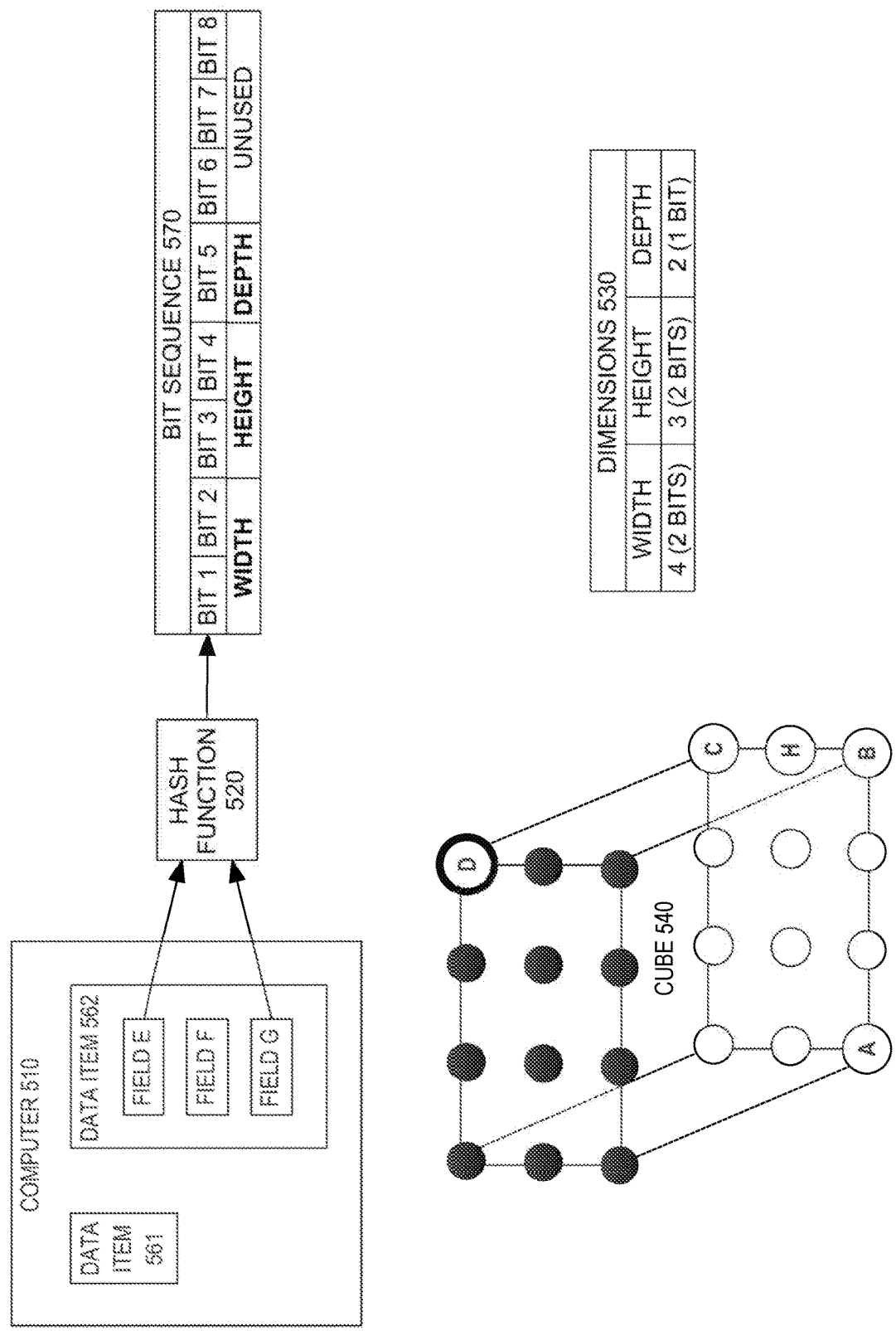
FIG. 5 is a block diagram that depicts an example distributed system that hashes a data item into a bit string that is split into substrings that each may be used for data repartitioning during a particular communication phase, in an embodiment.

FIG. 5 is a block diagram that depicts an example distributed system 500, in an embodiment. Distributed system 500 hashes a data item into a bit string that is split into substrings that each may be used for data repartitioning during a particular communication phase.

Distributed system 500 may be an implementation of distributed system 100. Distributed system 500 contains computers (such as 510) that are arranged into cube 540 that is a three dimensional logical topology.

6.1 Extent

Cube 540 has three dimensions (width, height, and depth) that are summarized as dimensions 530. The extent of each dimension may or may not be different.

For example, the width dimension spans from grid point A to grid point B for a total extent of four computers. Thus, the width of cube 540 is four, as shown in dimensions 530.

Likewise, the height dimension spans from grid point B to grid point C for a total extent of three, as shown in dimensions 530. Likewise, the depth dimension spans from grid point C to grid point D for a total extent of two, as shown in dimensions 530

6.2 Content Address

For addressing and routing, distributed system 500 may assign a unique bit string to each computer. The size of the bit string depends on what are the sizes of the width, height, and depth dimensions of cube 540.

The bit string should have $\log_2$(extent) bits for each dimension. Thus as shown in dimensions 530, the bit string should have $\log_2(4)+\log_2(3)+\log_2(2)=2+2+1=$ five bits.

Cube 540 has 24 grid points arranged as shown as 4×3×2. However, the 24 grid points may be arranged into other three dimensional shapes such as 6×2×2, 12×2×1, and 24×1×1, all of which need bit strings of five bits. Although different shapes may all need five-bit strings, for each shape the bit strings should be decomposed (split into substrings) in different ways for content-based addressing and routing.

6.3 Hash

The dataflow of a bit string flows as shown from data item 562 through hash function 520 into bit sequence 570 to support content-based data repartitioning. Part or all of data item 562 may be used as content-based input into hash function 520. For example, data item 562 may contain discrete fields E-G.

6.4 Database Table

For example, each of data items 561-562 may be a tuple (row) of a database table.

For example, each of fields E-G may correspond to a respective column of the database table.

6.5 Join

For example, fields E and G may together form a compound key that occurs in the database table as a foreign key across a schematic relation to match a (compound) primary key of another database table. For example, distributed system 500 may accomplish a distributed join of both database tables.

6.6 Key

As shown, fields E and G are used together as input into hash function 520 as shown. Either of fields E or G, or both together as a composite, may or may not be a row key, such as a compound key.

Thus, hash function 520 may or may not take a row key as input. Hash function 520 processes the values of fields E and G to derive bit sequence 570.

6.7 Substring

The bits of bit sequence 570 may be divided into substrings that are each associated with a respective dimension of dimensions 530. Thus as shown, a) bits 1-2 are reserved for the width dimensions, b) bits 3-4 are reserved for the height dimension, and c) bit 5 is reserved for the depth dimension.

The remaining bits 6-8 are unused. The reserved bits (e.g. 1-5) of bit sequence 570 need not be the least significant bits, although such bits are likely to be more evenly distributed than more significant bits.

The reserved bits need not be contiguous within bit sequence 570. For example (not shown), substrings for different dimensions may be internally separated by unused bits.

If the 24 grid points of cube 540 were instead arranged as 6×2×2, 12×2×1, or 24×1×1, then the division/allocation of the five-bit bit sequence 570 would be different. For example, arrangement as 24×1×1 allocates all five bits to the first dimension and no bits to the remaining two dimensions.

6.8 Equilateral Ideal

However, equilateral shapes (dimensions of equal extent) are ideal. Deviation from the equilateral ideal yield suboptimal communication patterns because communication would not be evenly divided amongst the phases, thereby causing needless contention during a busiest (most communicative) phase. Thus for a hypercube having D dimensions (and data repartitioning phases) and N grid points, the size of each linear subset of grid points (and the length of an edge of the hyperrectangle) is $$\sqrt[D]{N}.$$

For example, a square is better than other rectangles. Likewise, a cube is better than other right rectangular prisms.

6.9 Logical

The same computers may be arranged into different logical topologies having different dimensions. For example, sixteen computers may be arranged into a 4×4 square or a 2×2×2×2 tesseract, both of which are equilateral.

However, a 4×4 square and a 2×2×2×2 tesseract have different communication patterns. In that square, each computer communicates with three other computers during each of two phases. Whereas in that tesseract, each computer communicates with one other computer during each of four phases.

Thus, that square has 3×4=12 bi-directionally communicating pairs of computers per phase. Whereas, that tesseract has only 1×2×2×2=8 bi-directionally communicating pairs per phase.

Thus, fewer dimensions (e.g. square) communicates more during each of fewer phases. Whereas, more dimensions (e.g. tesseract) communicates less during each of more phases.

6.10 Physical

Which of a square, a cube, or a tesseract maximizes network throughput may depend on the underlying physical network topology and/or network switch capacity. For example, a hierarchical switching fabric that arranges network switches into many tiers (layers) may prefer more dimensions.

Whereas, a flat physical topology may prefer fewer dimensions. Dynamic analysis, such as simulation or empirical experimentation, may reveal how many dimensions should be overlaid upon a given physical topology. However as discussed later herein, static analysis is also possible.

6.11 Dynamism

Because hash function 520 maps data items to computer identifiers (bit strings), hash function 520 may be used for content-based partitioning across distributed system 500. For example, economic data for the fifty United States may be distributed to fifty computers based on which state.

Replacement of hash function 520 with a different hash function, lookup table, or other logic may accomplish a different partitioning of data. For example, replacement of hash function 520 may accomplish repartitioning that may or may not be based on conditions and decisions of an underlying software application that uses distributed system 500. For example, hash function 520 may be periodically adjusted based on the fluctuating relative workloads of different computers, thereby accomplishing load rebalancing.

7.0 Example Data Repartitioning Process

Figure 6:
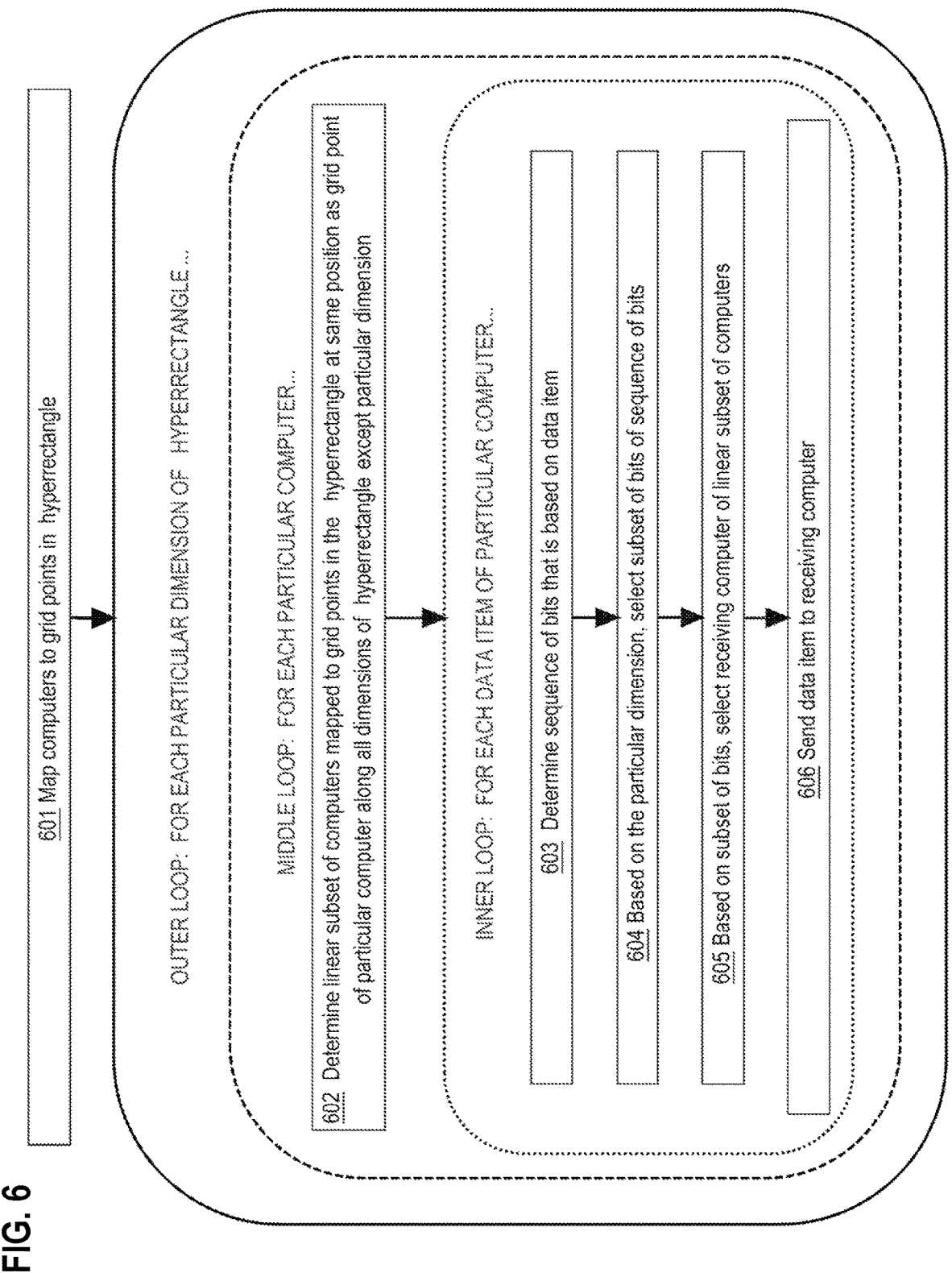
FIG. 6 is a flow diagram that depicts an example process that performs data repartitioning that is store and forward, content based, and phasic, in an embodiment.

FIG. 6 is a flow diagram that depicts an example process which performs data repartitioning that is store and forward, content based, and phasic. FIG. 6 is discussed with reference to FIG. 5.

7.1 Configuration

Step 601 is preparatory. Step 601 maps computers to grid points in a hyperrectangle.

For example, distributed system 500 assigns each computer (e.g. 510) to a respective grid point (e.g. one of A-D) in cube 540. Thus, the computers assume a multidimensional logical topology as an overlay network that may be independent of an underlying physical network topology.

7.2 Multitenancy

Distributed system 500 may host many software applications (e.g. programs). Each program may logically arrange the same computers into a) a same shape (topology), b) a different shape having a same amount of dimensions but different extents for those dimensions, or c) a shape having a different amount of dimensions.

For example, twelve computers may be logically arranged as a 3×4 rectangle, a 2×6 rectangle, or a 2×2×3 prism. The many programs may run concurrently on shared computers, even though the programs may or may not share a logical topology.

7.3 Example Algorithm

Various steps of steps 602-606 are repeated various times during three nested loops: an outer loop, a middle loop, and an inner loop. The combination of these three loops determine the asymptotic complexity of the overall process.

Steps 602-606 are repeated various times for each particular dimension of the hyperrectangle according to the outer loop. For example because cube 540 has three dimensions (e.g. prism), steps 602-606 are repeated various times during each of three iterations of the outer loop, with one iteration for each of the three dimensions.

During each iteration of the outer loop for a dimension, steps 602-606 are also repeated various times for each particular computer in the hyperrectangle according to the middle loop. For example because cube 540 has 24 grid points (and computers, not shown), steps 602-606 are repeated various times within each of 24 iterations of the middle loop, with one iteration for each computer.

Step 602 determines a linear subset of computers that are mapped to grid points in the hyperrectangle at a same position as the grid point of the particular computer along all dimensions of the hyperrectangle except the particular dimension. For example, distributed system 500 determines that grid points B-C (and their computers, not shown) are linearly aligned with grid point H (and its computer, not shown) along the vertical axis (height dimension). That is because grid points B-C and H are in a same position along the width and depth dimensions, but in different positions along the height dimension.

During each iteration of the middle loop for a particular computer, steps 603-606 are repeated for each data item of the particular computer, according to the inner loop. For example because particular computer 510 has two data items 561-562, steps 603-606 are repeated twice during iterations of the inner loop, with one iteration for each data item.

Step 603 determines a sequence of bits that is based on the data item. For example, computer 510 may use hash function 520 to obtain bit sequence 570 for data item 562.

Based on the particular dimension, step 604 selects a subset of bits of the sequence of bits. For example as shown, computer 510 may select bits 3-4 of bit sequence 570 for the height dimension.

Based on the subset of bits, step 605 selects a receiving computer of the linear subset of computers. For example based on bits 3-4 of bit sequence 570, computer 510 may select grid point C (and its computer) to receive data item 562. For example, bits 3-4 may together encode an unsigned integer that may be used as a zero-based index that enumerates grid points B, H, and C.

Step 606 send the data item to the receiving computer. For example, computer 510 may be mapped to grid point H. Computer 510 may send data item 562 to grid point C (and its computer).

8.0 Physical Tiers

Figure 7:
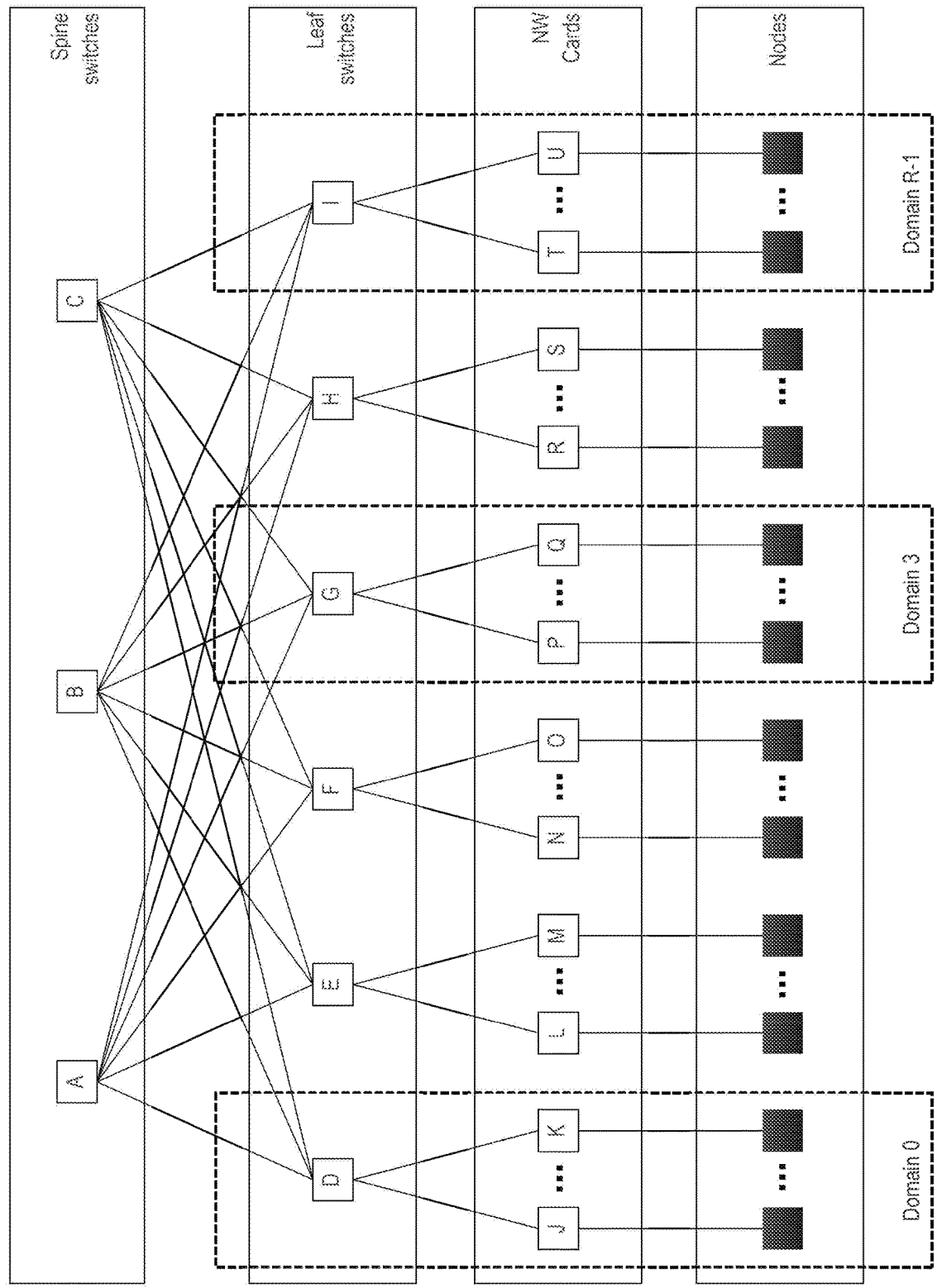
FIG. 7 is a block diagram that depicts example physical tiers that are a hierarchy of network elements upon which a multidimensional logical topology and phased data repartitioning may be superimposed, in an embodiment.

FIG. 7 is a block diagram that depicts an example physical tiers 700, in an embodiment. Physical tiers 700 is a hierarchy of network elements upon which a multidimensional logical topology and phased data repartitioning may be superimposed.

8.1 Heterogeneity

Physical tiers 700 may be an implementation of distributed system 100. Physical tiers 700 contains heterogeneous network elements A-U.

The network elements include network cards J-U, leaf switches D-I, and spine switches A-C. Thus, Physical tiers 700 has three tiers: spine switches, leaf switches, and endpoints (network cards).

8.2 Network Card

Each network cards is part of an endpoint computer (or 'node' as shown) is drawn as a black rectangle. Each computational node may have at least one network card, such as a network interface card (NIC).

8.3 Domain

Each node (and its network cards) is connected to a leaf switch. A domain (drawn as a dashed rectangle) is composed of the nodes that share a leaf switch.

For example, at least network cards P-Q (and their nodes) are in domain 3 because network cards P-Q are connected to leaf switch G. Network cards in a same domain may communicate with each other in two hops.

In embodiments, individual network elements may be aggregated into a combined network element for data repartitioning purposes. For example during a first phase, a domain (leaf switch and the network cards of the nodes connected to the leaf switch) may treated as one network element.

8.4 Spine

For example during the first phase, data items sent by nodes a) through an original leaf switch, b) through a spine switch, and then c) to a destination leaf switch. That is during the first phase, a data item may be sent from one domain to another domain.

Thus, the extent of the first data repartitioning dimension is six because there are six domains (and leaf switches). For example during the first phase, network card J may send a data item a) through leaf switch D, b) through any spine switch, and then c) to leaf switch I.

8.5 Leaf

Leaf and spine switches may support a link layer protocol such as Ethernet, Fibre Channel, or InfiniBand. Each leaf switch is connected to all spine switches.

For example, leaf switch G is connected to all spine switches A-C. Leaf switches need not be connected to each other.

During a second phase, each leaf switch may distribute its data items to network cards directly connected to the leaf switch. Thus, the extent of a second data repartitioning dimension is at least two because there are at least two network cards attached to each leaf switch. For example during the second phase, leaf switch I may finish delivery of the data item by sending the data item to network card U.

8.6 Rectangle

Thus, data items may traverse from a network card in one domain to another network card in another domain in two phases. Thus, a logical topology having two dimensions (i.e. 6×2 rectangle) is superimposed upon physical tiers 700.

8.7 Tesseract

In embodiments, more than two dimensions/phases may be used. For example, a (four dimensional) tesseract may be superimposed as a logical topology upon physical tiers 700.

For example, network card P may send a message to leaf switch G during a first phase. Leaf switch G may relay the message to network card Q during a second phase.

Network cards in separate domains may communicate with each other in four hops. For example, network card J may send a message to leaf switch D during a first phase.

Leaf switch D may relay the message to any spine switch A-C during a second phase. The spine switch may relay the message to leaf switch I during a third phase.

Leaf switch I may relay the message to network card U during a fourth phase. Thus, all-to-all communication is achieved for the nodes of physical tiers 700 in four phases.

Because there are four phases, the logical topology has four dimensions (not shown). Thus to send a message from one network card to another network card, data repartitioning entails four phases: 1) to a leaf switch, 2) to a spine switch, 3) to another leaf switch, and 4) to a network card.

The extent of the first dimension is one, because each network card is connected to only one leaf switch. The extent of the second dimension is three, because the leaf switch is connected to three spine switches.

The extent of the third dimension is six, because each spine switch is connected to all six leaf switches. The extent of the fourth dimension is at least two, because there are at least two network cards connected to a leaf switch.

Thus, the logical topology for physical tiers 700 has 1×3×6×2=36 grid points. Thus, each network card should be identified/addressed by a unique bit string having at least $\log_2(1)+\log_2(3)+\log_2(6)+\log_2(2)=0+2+3+1=$ six bits.

Six-bit strings for network cards may seem anomalous because only four bits are needed to uniquely enumerate the twelve network cards. However, a bit string is also used for phased data repartitioning that needs extra bits to navigate through the leaf and spine switches.

8.8 Non-Uniformity

As explained above, some messages originate and terminate within a same domain (leaf switch). However, data repartitioning is based on a six-bit string that if naively processed could cause a message to be needlessly routed from a leaf switch to a spine switch and then back to the same leaf switch.

Indeed for efficiency, a message that is multi-dimensionally routed should never revisit a same network element (e.g. same leaf switch) in different phases. Thus, each leaf switch may be configured to detect that a bit string would cause re-visitation. Upon such detection, the leaf switch may more or less immediately relay the message to the final destination network card as if the fourth (last) data repartitioning phase were occurring, even though it may actually still be the second data repartitioning phase.

9.0 Pipeline

Figure 8:
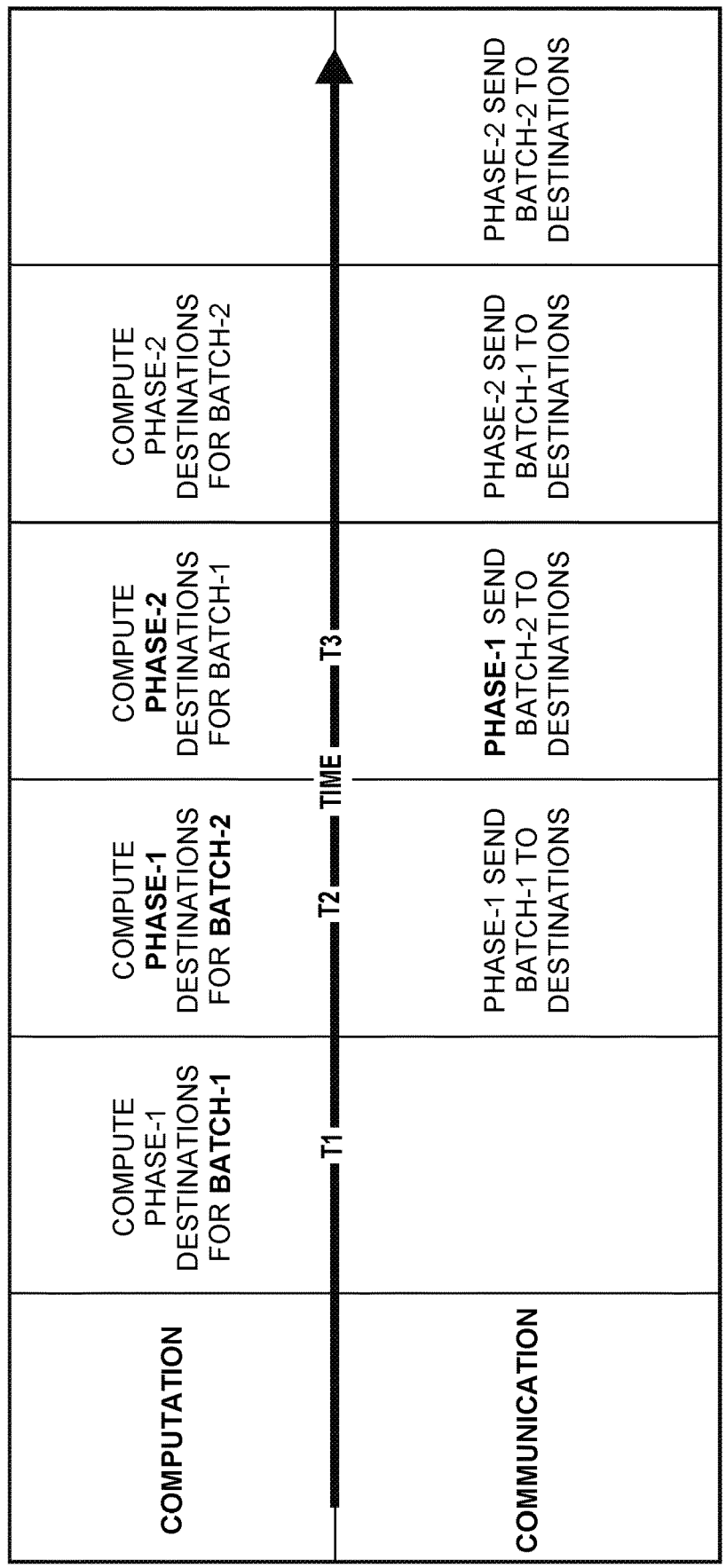
FIG. 8 is a timeline that depicts an example batch pipeline that achieves pipeline parallelism by dividing the data items of each phase into batches such that a next batch may be calculated while a prior batch is simultaneously transmitted, in an embodiment.

FIG. 8 is a timeline that depicts an example batch pipeline 800, in an embodiment. Batch pipeline 800 achieves pipeline parallelism by dividing the data items of each phase into batches such that a next batch may be calculated while a prior batch is simultaneously transmitted.

9.1 Timeline

Time elapses from left to right along a timeline as shown by the bold horizontal arrow. The timeline is divided into temporally adjacent moments such as T1-T3.

A dimensional data repartitioning phase spans multiple moments. For example, phase 1 spans moments T1-T3 as explained below.

9.2 Batch

During a same moment, each network element may perform a data repartitioning computation (shown above the timeline arrow) and a network communication (shown below the timeline arrow). For example during moment T1, each network element may perform data repartitioning computations for batch 1, which is a subset of all data items that need transmission during dimensional data repartitioning phase 1.

9.3 Computation

Data repartitioning computations may include any of: a) extracting data items from messages received from other network elements, b) hashing those data items to derive bit strings, c) isolating bit substrings for the current dimension/phase, d) selecting receiving network elements based on bit substrings, and e) filling new messages with data items based on receiving network elements.

9.4 Communication

During moment T2, each network element performs data repartitioning computations for a next batch (i.e. batch 2). Also (e.g. simultaneously) during moment T2, each network element communicates the prior batch (i.e. batch 1) to the receiving network elements. Thus, pipelining (pipeline parallelism) is achieved by computing a next batch while simultaneously transmitting a prior batch.

9.5 Overlap

Pipelining may be further achieved by overlapping a prior and next dimensional data repartitioning phase. For example during moment T3, phase 2 data repartitioning computation begins even though phase 1 communication is still ongoing.

10.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
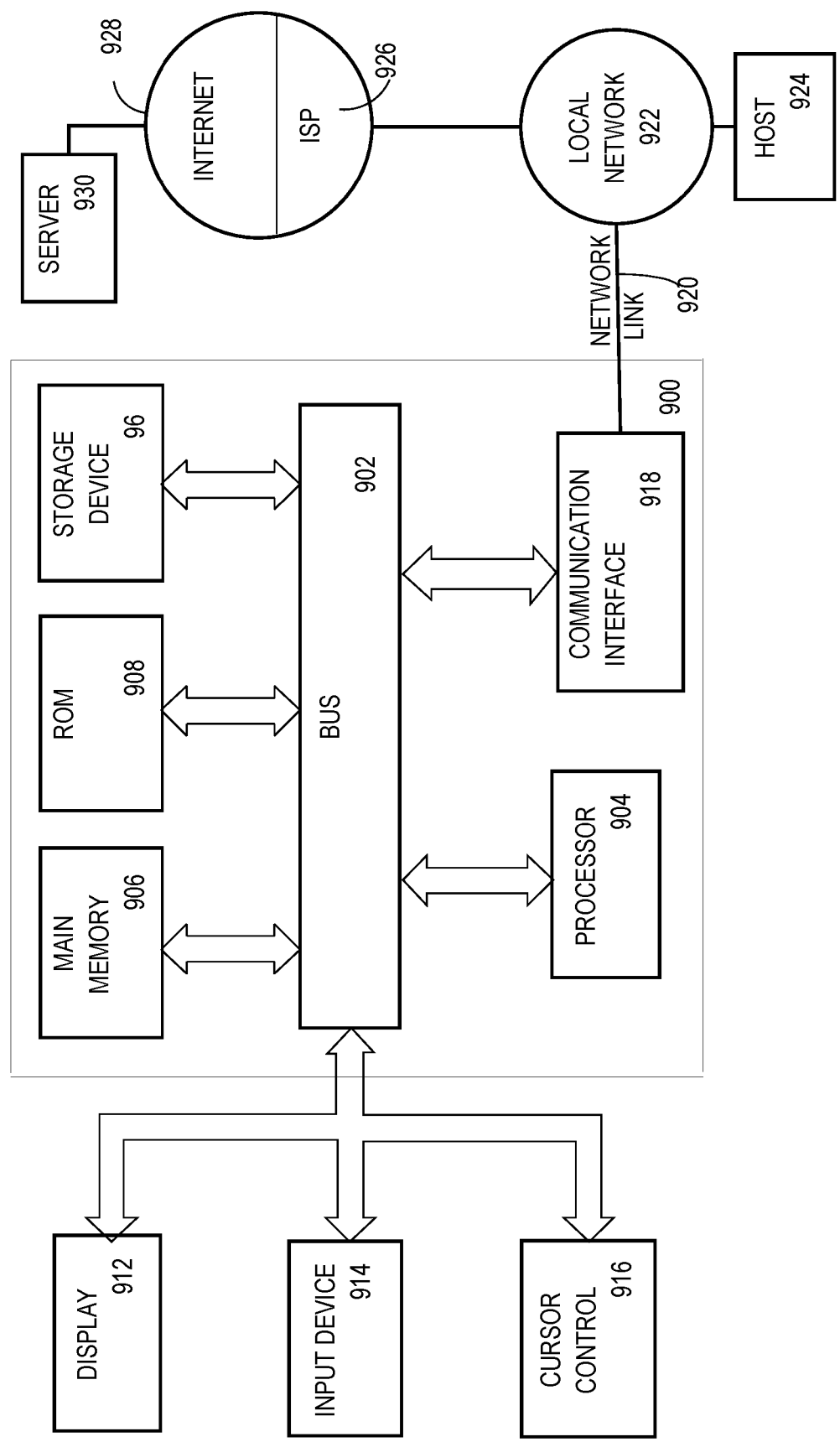
FIG. 9 is a block diagram that illustrates a computer system upon which an embodiment of the invention may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 96, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 96. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 96. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 96 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 96, or other non-volatile storage for later execution.

11.0 Software Overview

Figure 10:
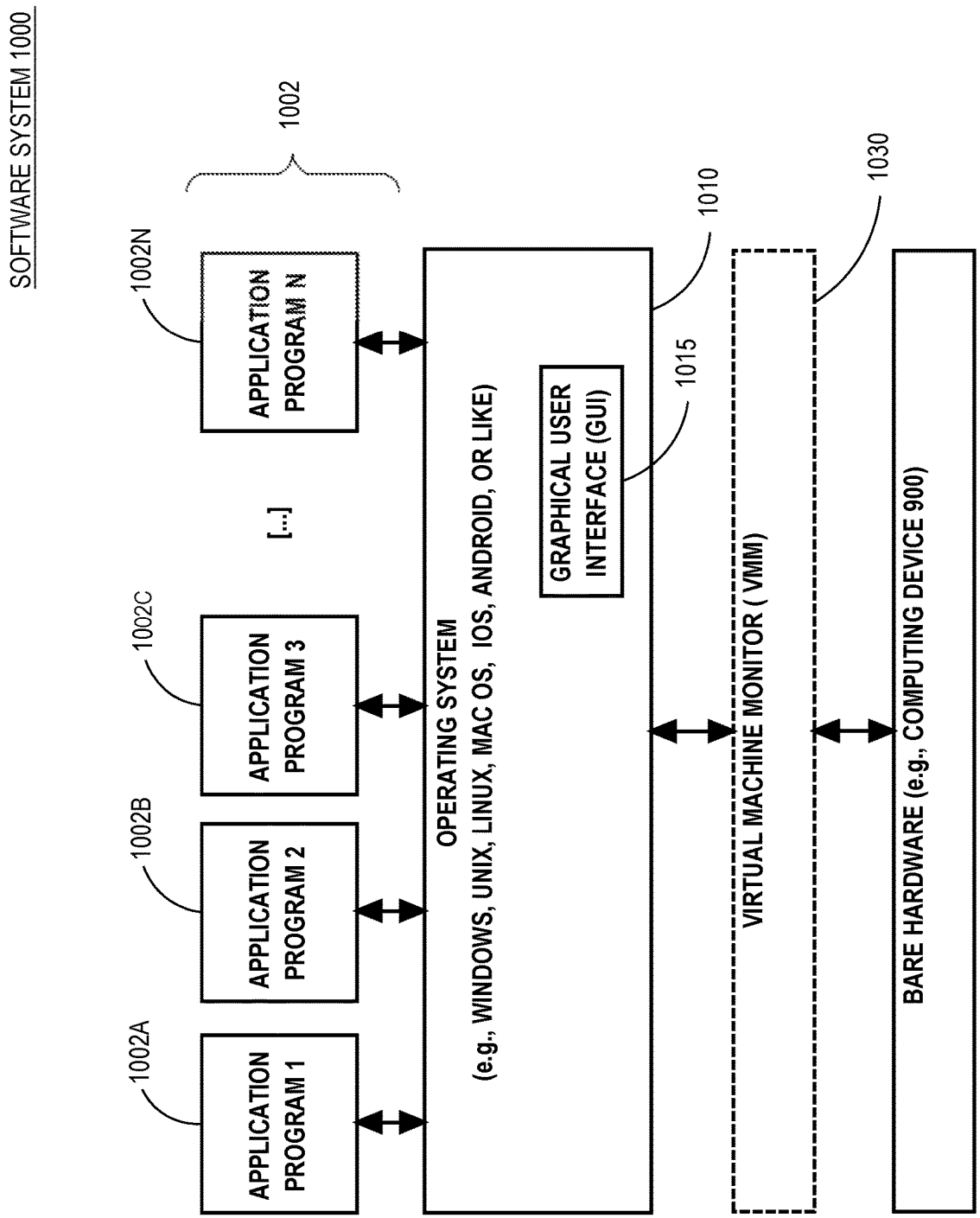
FIG. 10 is a block diagram that illustrates a basic software system 500 that may be employed for controlling the operation of a computing system.

FIG. 10 is a block diagram of a basic software system 1000 that may be employed for controlling the operation of computing system 900. Software system 1000 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1000 is provided for directing the operation of computing system 900. Software system 1000, which may be stored in system memory (RAM) 906 and on fixed storage (e.g., hard disk or flash memory) 96, includes a kernel or operating system (OS) 1010.

The OS 1010 manages low-level aspects of computer operation, including managing execution of processes, memory allocation, file input and output (I/O), and device I/O. One or more application programs, represented as 1002A, 1002B, 1002C . . . 1002N, may be "loaded" (e.g., transferred from fixed storage 96 into memory 906) for execution by the system 1000. The applications or other software intended for use on computer system 900 may also be stored as a set of downloadable computer-executable instructions, for example, for downloading and installation from an Internet location (e.g., a Web server, an app store, or other online service).

Software system 1000 includes a graphical user interface (GUI) 1015, for receiving user commands and data in a graphical (e.g., "point-and-click" or "touch gesture") fashion. These inputs, in turn, may be acted upon by the system 1000 in accordance with instructions from operating system 1010 and/or application(s) 1002. The GUI 1015 also serves to display the results of operation from the OS 1010 and application(s) 1002, whereupon the user may supply additional inputs or terminate the session (e.g., log off).

OS 1010 can execute directly on the bare hardware 1020 (e.g., processor(s) 104) of computer system 900. Alternatively, a hypervisor or virtual machine monitor (VMM) 1030 may be interposed between the bare hardware 1020 and the OS 1010. In this configuration, VMM 1030 acts as a software "cushion" or virtualization layer between the OS 1010 and the bare hardware 1020 of the computer system 900.

VMM 1030 instantiates and runs one or more virtual machine instances ("guest machines"). Each guest machine comprises a "guest" operating system, such as OS 1010, and one or more applications, such as application(s) 1002, designed to execute on the guest operating system. The VMM 1030 presents the guest operating systems with a virtual operating platform and manages the execution of the guest operating systems.

In some instances, the VMM 1030 may allow a guest operating system to run as if it is running on the bare hardware 1020 of computer system 1000 directly. In these instances, the same version of the guest operating system configured to execute on the bare hardware 1020 directly may also execute on VMM 1030 without modification or reconfiguration. In other words, VMM 1030 may provide full hardware and CPU virtualization to a guest operating system in some instances.

In other instances, a guest operating system may be specially designed or configured to execute on VMM 1030 for efficiency. In these instances, the guest operating system is "aware" that it executes on a virtual machine monitor. In other words, VMM 1030 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

12.0 Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
mapping a plurality of network elements to a plurality of grid points in a hyperrectangle comprising a plurality of dimensions, wherein each network element of the plurality of network elements contains a plurality of data items;
for each particular dimension of the plurality of dimensions, during a respective phase, of a sequence of phases, that corresponds to the particular dimension:
for each particular network element of the plurality of network elements:
determining a linear subset of network elements of the plurality of network elements that are mapped to grid points in the hyperrectangle at a same position as the grid point of the particular network element along all dimensions of the plurality of dimensions except the particular dimension;
for each data item of the plurality of data items of the particular network element:
determining a sequence of bits that is based on the data item;
selecting, based on the particular dimension, a subset of bits of the sequence of bits;
selecting, based on the subset of bits, a receiving network element of the linear subset of network elements; and
sending the data item to the receiving network element.

2. The method of claim 1 wherein the plurality of network elements comprises a plurality of computers and a plurality of network switches.

3. The method of claim 2 wherein each tier of a plurality of interconnection tiers comprises a subset of network switches of the plurality of network switches.

4. The method of claim 3 wherein:
the plurality of interconnection tiers consists of a leaf tier and a spine tier;
each computer of the plurality of computers is connected to at least one network switch of the leaf tier;
each network switch of the leaf tier is connected to at least one network switch of the spine tier.

5. The method of claim 4 wherein:
the plurality of dimensions consists of a first dimension and a second dimension;
the linear subset of network elements consists of network switches of the leaf tier when the particular dimension is the first dimension;
the linear subset of network elements consists of computers of the plurality of computers connected to a same network switch of the leaf tier when the particular dimension is the second dimension.

6. The method of claim 4 wherein:
each computer of the plurality of computers is connected to only one network switch of the leaf tier;
the network switches of the leaf tier are not connected to each other;
the network switches of the spine tier are not connected to each other.

7. The method of claim 1 wherein the plurality of network elements comprises a plurality of network interface cards (NICs) of a same computer.

8. The method of claim 1 wherein the plurality of network elements comprises at least one network switch for at least one network protocol selected from the group consisting of: Ethernet, InfiniBand, and Fibre Channel.

9. The method of claim 1 wherein a count of the plurality of network elements exceeds 1,000.

10. The method of claim 1 wherein the plurality of network elements achieve all-to-all repartitioning of the data items of the plurality of network elements.

11. The method of claim 1 wherein the plurality of network elements achieve a distributed join of a first table and a second table of a relational database.

12. The method of claim 1 wherein the sequence of bits is based on a primary key of a table of a relational database.

13. The method of claim 1 wherein the plurality of network elements perform a distributed shuffle for at least one selected from the group consisting of: MapReduce and bulk synchronous parallel (BSP).

14. The method of claim 1 wherein:
the method is performed for a first software application;
the method is performed for a second software application;
the first software application and the second software application share the plurality of network elements;
a count of the plurality of dimensions for the first software application does not match a count of the plurality of dimensions for the second software application.

15. The method of claim 1 wherein a count of the plurality of dimensions is based on a count of the plurality of network elements.

16. The method of claim 1 wherein determining a sequence of bits comprises hashing.

17. The method of claim 1 wherein:
sending the data item to the particular network element comprises:
sending the data item to the receiving network element for later forwarding to a third network element of the plurality of network elements;
sending the data item in a message that contains a second data item to be delivered to a fourth network element of the plurality of network elements.

18. The method of claim 17 wherein sending the data item in the message that contains the second data item comprises sending the data item and the second data item in a same network packet.

19. The method of claim 1 wherein:
the plurality of data items of the particular network element contains a first batch of data items and a second batch of data items;
the method comprises concurrently:
sending a data item of the first batch to a receiving network element for a first dimension; and
selecting, based on a second dimension, a second subset of bits of a second sequence of bits.

20. The method of claim 1 wherein a count of the plurality of dimensions exceeds two.

21. The method of claim 1 wherein sending the data item comprises sending at least one bit of the sequence of bits.

22. The method of claim 1 wherein sending the data item does not comprise sending a bit of the sequence of bits.

23. The method of claim 1:
further comprising inspecting the sequence of bits to detect that the data item would revisit the particular network element for a later dimension that is not the particular dimension.

24. One or more non-transitory machine-readable media storing instructions that, when executed by one or more processors, cause:
mapping a plurality of network elements to a plurality of grid points in a hyperrectangle comprising a plurality of dimensions, wherein each network element of the plurality of network elements contains a plurality of data items;

for each particular dimension of the plurality of dimensions, during a respective phase, of a sequence of phases, that corresponds to the particular dimension:

for each particular network element of the plurality of network elements:

determining a linear subset of network elements of the plurality of network elements that are mapped to grid points in the hyperrectangle at a same position as the grid point of the particular network element along all dimensions of the plurality of dimensions except the particular dimension;

for each data item of the plurality of data items of the particular network element:

determining a sequence of bits that is based on the data item;

selecting, based on the particular dimension, a subset of bits of the sequence of bits;

selecting, based on the subset of bits, a receiving network element of the linear subset of network elements; and sending the data item to the receiving network element.

25. The one or more non-transitory machine-readable media of claim 24 wherein the plurality of network elements comprises a plurality of computers and a plurality of network switches.

26. The one or more non-transitory machine-readable media of claim 25 wherein each tier of a plurality of interconnection tiers comprises a subset of network switches of the plurality of network switches.

27. The one or more non-transitory machine-readable media of claim 26 wherein:

the plurality of interconnection tiers consists of a leaf tier and a spine tier;

each computer of the plurality of computers is connected to at least one network switch of the leaf tier;

each network switch of the leaf tier is connected to at least one network switch of the spine tier.

28. The one or more non-transitory machine-readable media of claim 27 wherein:

the plurality of dimensions consists of a first dimension and a second dimension;

the linear subset of network elements consists of network switches of the leaf tier when the particular dimension is the first dimension;

the linear subset of network elements consists of computers of the plurality of computers connected to a same network switch of the leaf tier when the particular dimension is the second dimension.

29. The one or more non-transitory machine-readable media of claim 27 wherein:

each computer of the plurality of computers is connected to only one network switch of the leaf tier;

the network switches of the leaf tier are not connected to each other;

the network switches of the spine tier are not connected to each other.

30. The one or more non-transitory machine-readable media of claim 24 wherein the plurality of network elements comprises a plurality of network interface cards (NICs) of a same computer.

31. The one or more non-transitory machine-readable media of claim 24 wherein the plurality of network elements comprises at least one network switch for at least one network protocol selected from the group consisting of: Ethernet, InfiniBand, and Fibre Channel.

32. The one or more non-transitory machine-readable media of claim 24 wherein a count of the plurality of network elements exceeds 1,000.

33. The one or more non-transitory machine-readable media of claim 24 wherein the instructions further cause the plurality of network elements to achieve all-to-all repartitioning of the data items of the plurality of network elements.

34. The one or more non-transitory machine-readable media of claim 24 wherein the instructions further cause the plurality of network elements to achieve a distributed join of a first table and a second table of a relational database.

35. The one or more non-transitory machine-readable media of claim 24 wherein the sequence of bits is based on a primary key of a table of a relational database.

36. The one or more non-transitory machine-readable media of claim 24 wherein the instructions further cause the plurality of network elements to perform a distributed shuffle for at least one selected from the group consisting of: MapReduce and bulk synchronous parallel (BSP).

37. The one or more non-transitory machine-readable media of claim 24 wherein a count of the plurality of dimensions is based on a count of the plurality of network elements.

38. The one or more non-transitory machine-readable media of claim 24 wherein determining a sequence of bits comprises hashing.

39. The one or more non-transitory machine-readable media of claim 24 wherein:

sending the data item to the particular network element comprises:

sending the data item to the receiving network element for later forwarding to a third network element of the plurality of network elements;

sending the data item in a message that contains a second data item to be delivered to a fourth network element of the plurality of network elements.

40. The one or more non-transitory machine-readable media of claim 39 wherein sending the data item in the message that contains the second data item comprises sending the data item and the second data item in a same network packet.

41. The one or more non-transitory machine-readable media of claim 24 wherein;

the plurality of data items of the particular network element contains a first batch of data items and a second batch of data items;

the instructions further cause concurrently:

sending a data item of the first batch to a receiving network element for a first dimension; and selecting, based on a second dimension, a second subset of bits of a second sequence of bits.

42. The one or more non-transitory machine-readable media of claim 24 wherein a count of the plurality of dimensions exceeds two.

43. The one or more non-transitory machine-readable media of claim 24 wherein sending the data item comprises sending at least one bit of the sequence of bits.

44. The one or more non-transitory machine-readable media of claim 24 wherein sending the data item does not comprise sending a bit of the sequence of bits.

45. The one or more non-transitory machine-readable media of claim 24 wherein the instructions further cause inspecting the sequence of bits to detect that the data item would revisit the particular network element for a later dimension that is not the particular dimension.

\* \* \* \* \*

UNITED STATES PATENT AND TRADEMARK OFFICE
CERTIFICATE OF CORRECTION

| | | |
|---|---|---|
| PATENT NO. | : 10,862,755 B2 | Page 1 of 1 |
| APPLICATION NO. | : 15/639265 | |
| DATED | : December 8, 2020 | |
| INVENTOR(S) | : Basant et al. | |

It is certified that error appears in the above-identified patent and that said Letters Patent is hereby corrected as shown below:

On the Title Page

On page 2, Column 2, under Other Publications, Line 11, delete ""InfinBand" and insert -- "InfiniBand --, therefor.

On page 2, Column 2, under Other Publications, Line 19, delete "http://ieexplore,ieee." and insert -- http://ieeexplore.ieee. --, therefor.

In the Specification

In Column 10, Line 52, after "530" insert -- . --.

In the Claims

In Column 22, Line 58, in Claim 23, delete "claim 1:" and insert -- claim 1 --, therefor.

In Column 24, Line 47, in Claim 41, delete "wherein;" and insert -- wherein: --, therefor.

Signed and Sealed this
First Day of June, 2021

Drew Hirshfeld
*Performing the Functions and Duties of the
Under Secretary of Commerce for Intellectual Property and
Director of the United States Patent and Trademark Office*